Patented Dec. 12, 1939

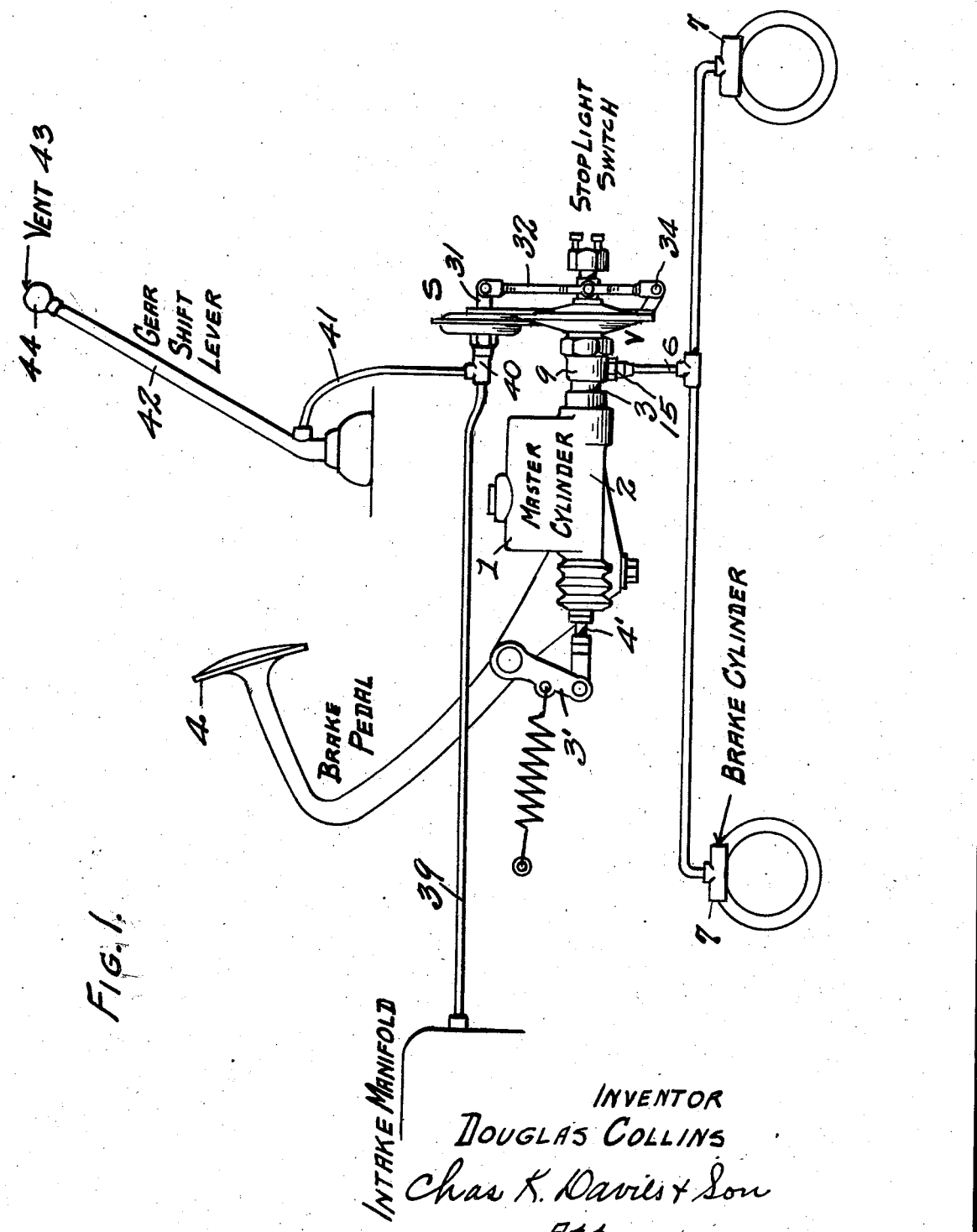

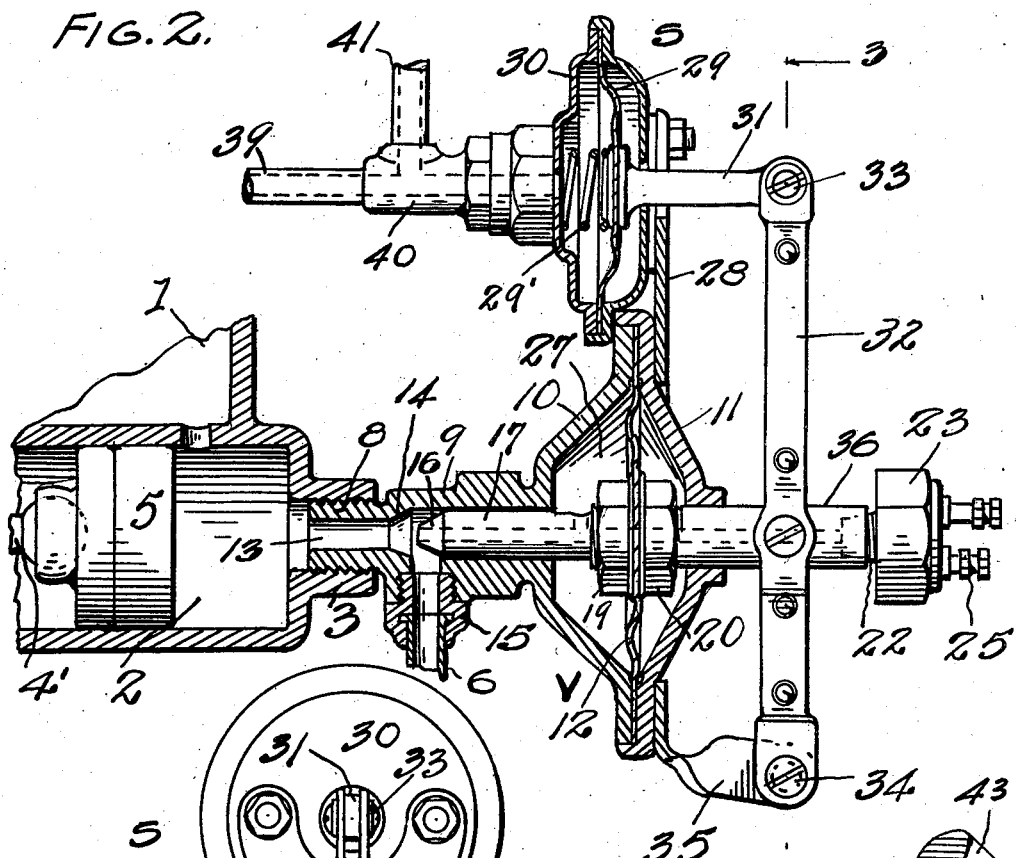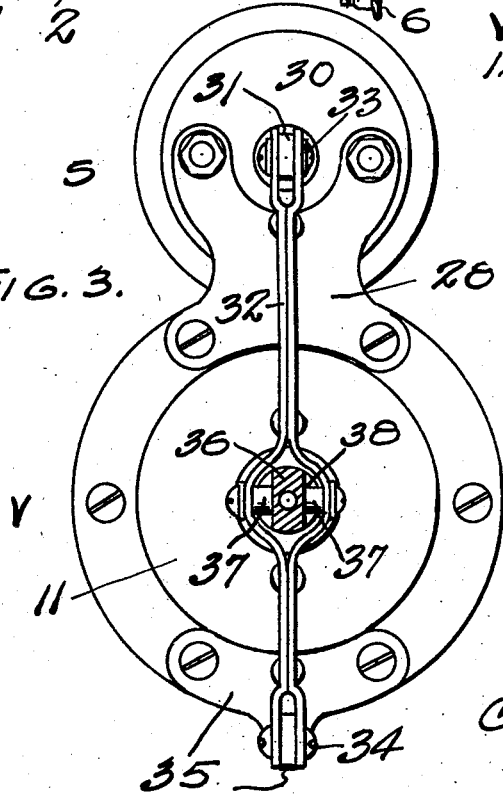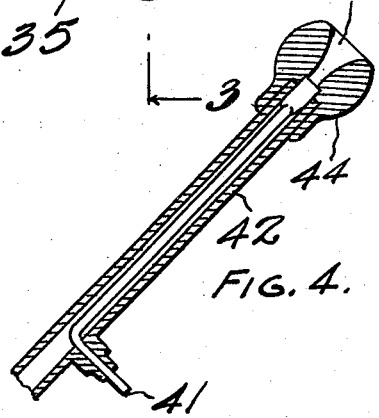

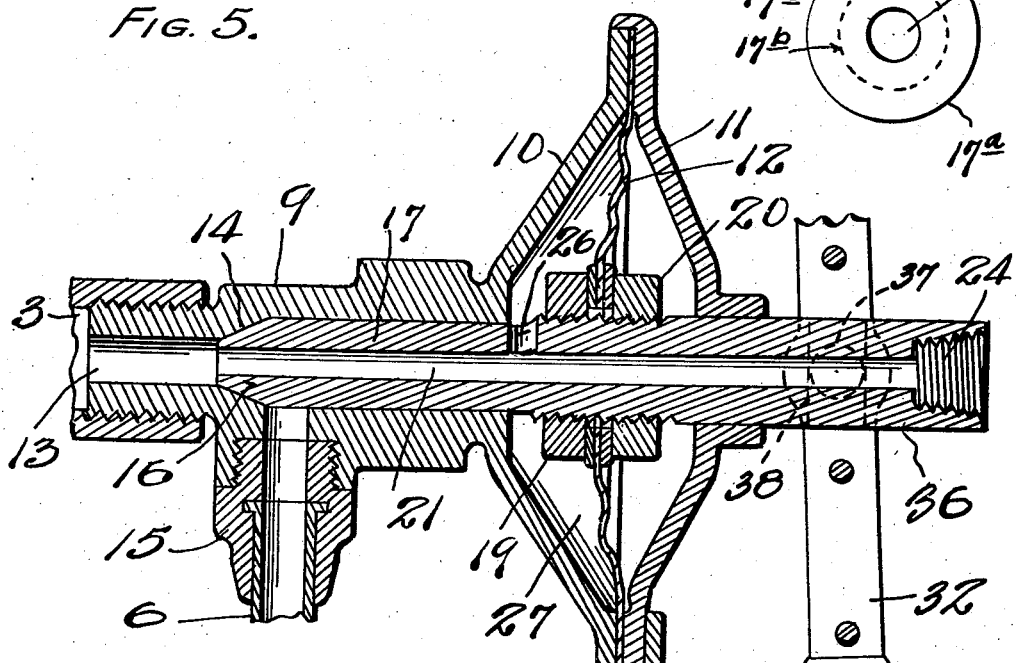
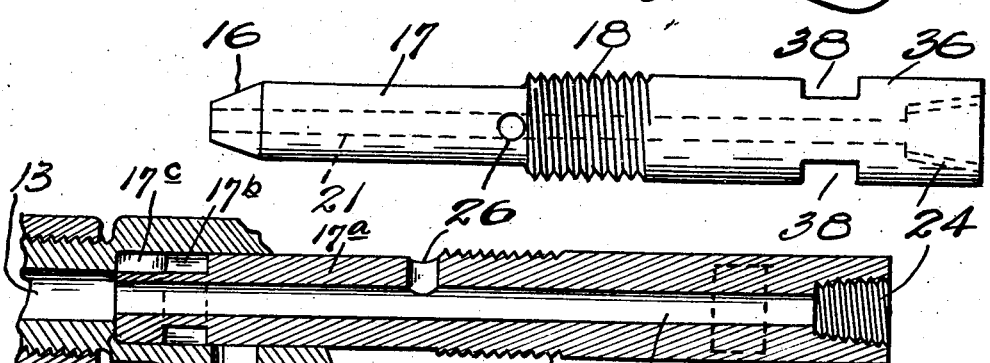

2,183,444

UNITED STATES PATENT OFFICE 2,183,444

AUXILIARY CONTROL FOR HYDRAULIC BRAKES

Douglas Collins, Salisbury, N. C.

Application February 25, 1938, Serial No. 192,619

11 Claims. (Cl. 188—152)

My present invention relates to an auxiliary control for hydraulic brakes employed on automotive vehicles. The auxiliary control mechanism of my invention may be used in various relations, and when employed on automotive vehicles the mechanism is operated in connection with motive fluid pressure responsive to the engine when running. The invention is of the "hill-holder" type, and as an auxiliary attachment, it can be interposed in and used with practically all of the standard fluid pressure operated brakes, and especially hydraulic brake-systems, without any material change whatever in the original functions, construction, and operation of the existing brake systems.

The invention consists in combining with an internal combustion engine employed for the propulsion of an automotive vehicle, the fluid-pressure operated brake-applying mechanism for the vehicle, and other accessories, of an auxiliary control mechanism including a normally opened valve-device interposed in the brake-system, a differential fluid pressure operated servo-motor for the valve-device constantly in communication with the internal combustion engine; and a bleeder-line or venting-line in constant communication with the engine-side of the servo-motor, normally open to the atmosphere and under manual control, whereby the servo-motor is capable of being rendered inaccessible to atmospheric pressure in order that suction from the engine may maintain the brakes in applied position.

The pedal operated brakes, of course, may be applied at all times, as usual, even though the vent or bleeder line may be capped or closed to the atmosphere. Thus, in order to apply the brakes while the vent is closed to the atmosphere, the depression of the brake-pedal creates a fluid pressure or braking pressure that is greater than the engine-suction, and therefore the hydraulic brake-pressure overcomes the power of the engine-suction in an application of the brakes under these conditions.

Under such conditions, when the foot is again removed from the brake-pedal thereby releasing the brake-pressure, the hydraulic pressure is decreased below the power of the engine-suction, and the auxiliary mechanism again becomes operative for the performance of its functions.

In carrying out my invention I employ a valve-device that is normally open and interposed in the braking system between the master-cylinder and the brake-cylinders, and after the brakes have been applied by the brake-pedal movement, the valve may be automatically closed by differential fluid pressure in the vacuum servo-motor for retaining the brakes in applied position. While the brakes are thus retained, the driver is free to remove his foot from the brake pedal.

In venting, or closing by capping the bleeder line of the servo-motor to create differential fluid pressure therein for the purpose of closing the valve, I dispense with the usual mechanically controlled devices employed for that purpose, and substitute the fluid pressure control, to insure efficiency, convenience and smoothness in the operation of the auxiliary control mechanism.

By the utilization of the auxiliary control mechanism of my invention in combination with the standard hydraulic braking mechanism, the braking system is rendered more efficient and flexible, and the driver of the automotive vehicle is relieved of the necessity for constant and continuous use of his foot in connection with the brake-pedal, thereby enabling him to use his foot for other duties in control of the vehicle. Thus, the driver of the automotive vehicle can use his left foot on the clutch-pedal, his right foot on the accelerator, his left hand on the steering wheel, and his right hand to control both the brakes and the gear shift lever, when necessity requires such control, as for instance when starting the vehicle on an up-hill grade, in which event the auxiliary mechanism is employed as a "hill-holder."

In addition to the above broad statement of invention, my auxiliary control for hydraulic brakes consists in certain novel combinations and arrangements of parts as will hereinafter be more fully set forth and claimed. In the accompanying drawings I have illustrated the auxiliary mechanism combined with a conventional hydraulic braking system, but it will be understood that changes and alterations may be made in these exemplifying structures within the scope of my claims, without departing from the principles of my invention.

Figure 1 is an assembly view showing the auxiliary control mechanism combined with a conventional hydraulic braking system for automotive vehicles.

Figure 2 is an enlarged vertical sectional view showing the discharge end of the master cylinder, the valve device, and the servo-motor, the parts being shown in position as with the brakes applied, and the control valve open.

Figure 3 is a view in elevation as at lines 3—3 of Figure 2, with the valve stem in cross section, and showing the leverage between the servo-motor and the valve stem.

Figure 4 is an enlarged detail sectional view of a converted gear shift lever of an automotive vehicle, showing the vent or pneumatic means for controlling the differential fluid pressure servo-motor, the vent being normally open to the atmosphere.

Figure 5 is an enlarged, detailed, vertical sectional view of the valve-device interposed between the master cylinder and the brake cylinders of the brake system, with the valve in closed position to cause retention of the applied brakes.

Figure 6 is a detail view of the valve-stem, detached.

Figures 7 and 8 are respectively a longitudinal sectional view, and a face view, of a modified form of the valve.

In order that the general arrangement, relation of parts, and utility of the invention may readily be understood I have illustrated so much of a conventional hydraulic brake-system as is necessary for the purpose. The oil reservoir 1 has the usual parts communicating with and supplying oil to the master cylinder 2 of the brake applying mechanism, and the oil under pressure is discharged through port 3 into the brake-system when the spring-returned brake-pedal 4 is depressed in usual manner. Through crank arm 3' and stem 4' the slide piston 5 is moved to the right in the cylinder to create brake-pressure in the pipe 6 and in the brake cylinders, two of which are shown at 7, 7, for the application of the brakes.

The auxiliary control mechanism of my invention, which includes a vacuum operated servo-motor indicated as a whole by the letter S, and a valve-device indicated as a whole by the letter V, is interposed between the discharge port 3 of the master-cylinder and the brake-cylinders, two of which are indicated as 7, 7.

The valve device, as best seen in Figure 2, is attached or connected to the master cylinder at its discharge end by means of a threaded nipple 8 that is screwed into the boss forming the discharge port 3 of the master cylinder. The nipple is rigidly mounted upon an extension 9 of one section 10 of the valve-casing, the other section 11 of the casing providing an interior chamber for a flexible and resilient diaphragm 12 that is clamped between the two sections of the casing.

In Fig. 2 it will be seen that when the brake pedal is depressed, the piston 5 is moved to force oil under pressure from the master cylinder 2, through the port 13 of the nipple 8, thence through a tapered valve-seat 14 in the interior of the extension 9, and thence the oil is forced down through an outlet port at the under side of the extension and through a pipe-connection 15 to the oil pipe 6 and the brake cylinders 7, for an application of the brakes.

After the brakes have been applied, passage of oil under pressure from the master cylinder through the valve seat 14 to the brake-pipe 6, may be cut off, for the purpose of retaining the applied brake-pressure in the brake cylinders, thus holding the brakes applied. This cut-off between the master-cylinder and the brake-cylinders is accomplished by the use of a needle valve, or tapered control valve 16 fashioned on one end of a tubular stem 17, which is externally threaded at 18, and mounted to slide in central openings of the casing 10—11. The stem also passes through a central opening in the diaphragm 12, and by means of a pair of lock nuts 19 and 20 screwed on the threads 18 at opposite sides of the diaphragm, the stem is mounted in the diaphragm for a slide-piston movement in its bearings in the valve casing and in the extension 9 of the casing.

The tubular stem is fashioned with a longitudinally extending bore or passage 21, alined with the longitudinal axis of the master cylinder 2, and the outer end of this passage is closed by suitable means, as a threaded tubular head 22 of a switch-casing 23. The threaded tubular head is screwed into a socket at the outer end of the stem, as the latter projects through the valve-casing, and the switch-casing contains a fluid-pressure operated circuit-maker or switch for the usual stop-light that is carried at the rear of the automotive vehicle; connections from the light being made to the terminals 25 of the switch.

As best seen in Figures 5 and 6 the tubular valve-stem is fashioned with a transversely extending port 26, which affords passage of oil from the bore 21 to the interior of an oil chamber 27 in the casing 10, at the brake-side of the casing. Thus it will be apparent that oil through the reduced bore 21 and port 26 having a subnormal pressure, or a pressure below that of the braking pressure, is constantly accessible for operating the stop-light switch, and also for extending the subnormal pressure against the brake-side of the diaphragm 12, as a safety measure, to assure unseating of the valve in the event that it is closed for any reason, when the brakes are to be applied.

In the event the auxiliary control mechanism is to be used as a "hill-holder" after the brakes are applied, the normally open valve is moved to its seat to close communication from the brake pipes and thereby retain the pressure already applied in the brake-pipes 6 and in the brake cylinders 7. This closing of the valve against tension of the resilient diaphragm 12, is accomplished through the action of differential fluid pressure operating in the servo-motor S, and through lever connections with the valve-stem 17. The servo-motor is preferably mounted above and rigid with the valve casing 10—11, through the use of a supporting bracket 28 fastened to both the valve casing and the servo-motor, and the motor includes a flexible diaphragm 29 mounted within the casing 30. The spring 29' urges the diaphragm to the right in Figure 2 in the absence of a vacuum at the left side of the diaphragm, and it acts to open the valve 16 and release the brakes. The diaphragm, by means of an arm 31 is connected to a lever 32 by the pivot 33, and the lower end of the lever is hinged or pivoted at 34 to a bracket 35 rigid with the lower part of the valve casing.

The lever is fashioned to straddle the projecting free end 36 of the valve stem 17, and the lever is provided with a pair of opposed pins or anti-friction rollers 37, which are located in exterior grooves 38 formed at opposite sides of the end 36 of the stem 17.

At one side of the diaphragm 29, the casing 30 is connected by a suction pipe 39 to the internal combustion engine, preferably its manifold, as shown, and this pipe provides constant communication between the servo-motor and the intake manifold for suction when the engine is running.

Through the interposition of a fixture 40 at the junction of the suction pipe 39 with the servo-motor, another pipe 41, which may be flexible, is connected with the interior of the engine-side or suction-side of the servo-motor, and this air pipe extends to the gear shift lever 42, through the lever to a vent or port 43 in the head 44 of the lever, the port being normally open to the atmosphere.

When the applied brake-pressure is to be retained in the brake-cylinders, the thumb or finger of the vehicle driver is placed over the port 43 to close it from the atmosphere, thereby creating a differential fluid pressure in the servo-motor, due to suction from the engine at the engine-side of the diaphragm 29. The diaphragm 29 is pulled to the left in Figure 2, and through the arm 31 the lever 32 is swung on its hinge 34 to slide the valve 16 to its seat 14.

It will be understod that the foot has been removed from the brake-pedal, and the spring-returned pedal has returned to its uplifted position, and that the brake-pressure has thus been released in the master cylinder.

To release the retained brakes, the thumb or finger is removed from the port 43 thereby admitting atmosphere to the suction side of the diaphragm 29 through the bleeder line, rendering ineffective the suction in pipe 39, and restoring equalized air pressure at opposite sides of the diaphragm 29. The resilient diaphragm 12 is now free to return to its normal position and withdraw the valve 16 from its seat 14, thereby equalizing the oil pressure in the master cylinder, brake pipes and brake-cylinders, and the brakes are released.

In the event the vehicle driver inadvertently causes the servo-motor to operate and close the valve 16 before he applies the brakes, the safety feature functions through oil under pressure in the tubular valve stem and in the chamber 27, when the pedal is depressed, to open the valve, and thereafter the brakes are under control of either the food or the hand, or in co-operation, under control of both the foot and the hand of the driver.

As is well known, suction from engine cylinders frequently diminishes during acceleration or high speeds of the engine, thereby reducing the available power required to operate various accessories of an automotive vehicle. Thus, in some instances the suction from the motor through pipe 39, may not develop sufficient differential fluid pressure within the servo-motor to maintain the valve 16—17 in closed position. Under these conditions the fluid pressure at opposite sides of the diaphragm 29 of the servo-motor is equalized, and this equalization of pressure permits the spring 29' in the servo-motor to expand and open or release the valve 16—17. The brakes are thus automatically released, so far as the auxliary mechanism is concerned, whether the vent port 43 is either capped or opened.

The auxiliary control mechanism is especially useful on long down-grades, in checking or retarding the speed of the vehicle, and by using the hand for control of the servo-motor instead of the foot on the brake pedal in thus checking or retarding the vehicle, the driver can relieve his foot of the usual required exertion, and also, the hand and the foot may co-operate for the relief of each other. Thus, on a long down-grade, the driver with his thumb closing the port 43, may readily maintain the brakes applied at the desired pressure.

If the vehicle is stopped on a down-grade by depression of the pedal with one foot while the clutch is thrown out with the use of the other foot, one of the feet may be relieved of duty, and the control of the brakes is taken over by the hand which operates the gear shift lever. Then in starting the vehicle down grade, the foot which controls the clutch is employed in combination with the hand on the gear shift lever, and the brakes may be "eased off" nicely under control of the auxiliary mechanism and the thumb in control of the port 43.

In the event the wheels of the vehicle are mired in mud, it is well known to drivers that a partial and controlled application of the brakes adds to the success in maneuvering, when an attempt is made to extricate the wheels from the mud. Before engine-power is applied under these conditions, the brakes are applied by pressure on the pedal with sufficient force to prevent the wheels from "spinning", and then the port 43 is closed or capped so that the auxiliary control mechanism will maintain and control the braking pressure as the power of the engine is applied to the vehicle. Thus the controlled power of the engine and the steadying influence of the auxiliary device on the brakes enables the driver to readily extricate the wheels of the vehicle from the mud.

In the modified form of the valve shown in Figures 7 and 8 and designated 17a, I dispense with the tapered head of the valve and use a flat face on the valve-head which fits into the seat 14a. Near the end of the valve-head I provide a peripheral exterior annular groove 17b which forms a transfer chamber or port, and a longitudinally extending, exterior groove 17c connects this annular groove with the front face of the valve, the port 17c being closed when the valve is closed, as in Figure 7. When the valve is withdrawn from its seat the annular groove 17b registers with port 6 or pipe to the brake cylinders, and communication is thus established between port 13 and port 6.

Having thus fully described my invention, what I claim as new and desire to secure by Letters Patent is:

1. The combination with an automotive propelling engine and its intake manifold, a hydraulic braking system having a master cylinder, a brake cylinder, and a line connecting said cylinders, of a normally open valve in the line between the cylinders, control means for said valve comprising a fluid pressure operated servo-motor having a vent pipe normally open to the atmosphere, said servo-motor being in constant communication with the intake manifold, and said vent pipe being adapted to be capped and thereby rendered inaccessible to atmospheric pressure to cause suction to develop differential fluid pressure within the servo-motor to close the valve.

2. The combinaton with an automotive propelling engine and its intake manifold, a hydraulic braking system having a master cylinder, a brake cylinder, and a line connecting said cylinders, of a normally open valve in the line between the cylinders, control means for said valve comprising a fluid pressure operated servo-motor having a vent pipe normally open to the atmosphere, said servo-motor being in constant communication with the intake manifold, said vent pipe being adapted to be capped and thereby rendered inaccessible to atmospheric pressure to cause suction to develop differential fluid pressure within the servo-motor to close the valve, and said control means also being operable, when suction diminishes during acceleration of the engine, for automatically releasing the brakes whether the vent pipe is capped or open.

3. The combination with an automotive propelling engine and its intake manifold, a hydraulic braking system, and pedal operated means for applying the brakes, of an auxiliary mechanism for rendering inoperative the pedal operated means to release the brakes and simultaneously holding the brakes applied, said auxiliary mechanism comprising a cut-off device between the brake system and the means for applying the brakes, a fluid pressure operated servo-motor for controlling said cut-off device and said servo-motor having a vent pipe normally open to the atmosphere, said servo-motor being in constant communication with the intake manifold, and said vent pipe being adapted to be capped and thereby rendered inaccessible to atmospheric pressure to cause suction to develop differential fluid pressure within the servo-motor to hold the brakes applied.

4. The combination with a pedal-operated hydraulic brake system for vehicles employing an internal combustion engine, of auxiliary mechanism for intercepting and retaining applied pressure in the brake system, control means for said mechanism comprising a fluid pressure operated servo-motor in constant communication with said engine, said servo-motor having a vent pipe normally open to the atmosphere, and said vent pipe being adapted to be capped and thereby rendered inaccessible to atmospheric pressure to cause suction to develop differential fluid pressure within the servo-motor to retain the applied pressure in the brake system.

5. The combination in a hydraulic braking system for use with an internal combustion engine and comprising a master cylinder having a discharge port, and actuating means for the master cylinder, of a valve device adapted to close said port, a fluid pressure operated servo-motor in constant communication with the engine and normally open to the atmosphere, a bleeder line connected to the servo-motor, a manually-controlled vent to said bleeder line adapted to be capped and thereby rendered inaccessible to atmospheric pressure, operating means between the servo-motor and the valve device for closing the latter, and means for opening said valve.

6. The combination in a hydraulic braking system for use with an internal combustion engine and comprising a master cylinder having a discharge port, of a control device including a normally open valve adapted to close the port, a fluid pressure safety device including means within the control device constantly open to said port for opening the valve, a differential fluid pressure operated servo-motor operatively connected with the valve and in constant communication with the engine, a bleeder line connected with the servo-motor, and said bleeder line having a port normally open to the atmosphere and adapted to be capped and thereby rendered inaccessible to atmospheric pressure to cause suction to develop differential fluid pressure within the servo-motor to close the valve.

7. In a fluid-pressure operated braking system, for an automotive vehicle having a propelling engine and engine-manifold, comprising a master cylinder, and brake cylinders adapted to receive pressure from the master cylinder to apply the brakes, the combination of a valve interposed between the master cylinder and the brake cylinders and adapted to be closed to maintain fluid pressure in the brake cylinders to hold the brakes applied against automatic valve-opening means, said valve-closing means being a pressure-sensitive device under influence of the engine-manifold vacuum and said pressure-sensitive device being rendered incapable to maintain the valve in closed position against action of the automatic valve-opening means when the manifold-vacuum diminishes during acceleration of the engine.

8. In a fluid pressure operated braking system for an automotive vehicle having an internal combustion engine and its intake manifold, the combination with a master cylinder, a brake cylinder, a line connecting said cylinders, and a normally open cut-off device between the cylinders, of control means for said cut-off device comprising a fluid pressure operated servo-motor having a vent normally open to the atmosphere and said servo-motor also being in constant communication with the intake manifold, said vent adapted to be capped and thereby rendered inaccessible to atmospheric pressure to cause suction to develop differential fluid pressure within the servo-motor and thereby close the cut-off to retain the brakes in applied position, and automatic means operable under equalized fluid pressure in the servo-motor for opening said cut-off device to release the brakes.

9. The combination with an automotive propelling engine and its intake manifold, of a hydraulic braking system having brake-applying means including a master cylinder, a brake cylinder, a line connecting said cylinders, an open valve in the line between the cylinders, a fluid pressure operated servo-motor connected to the intake manifold and adapted to close the valve and retain the brakes in applied position, and a hydraulic-operated electric stop-light switch adapted to be closed on brake applying movement, and opened on brake-releasing movement of the brake-applying means while the brakes are retained in applied position.

10. The combination with an automotive propelling engine and its intake manifold, of a hydraulic braking system having brake-applying means including a master cylinder, a brake cylinder and a line connecting said cylinders, an open valve having a tubular stem and located in the line between said cylinders, a fluid pressure operated servo-motor connected to the intake manifold and adapted to close the valve and thereby retain the brakes in applied position, an electric stop-light switch mounted on and closing one end of the tubular stem and the other end of the tubular stem being constantly open to the master cylinder, said switch adapted to be closed on brake-applying movement, and opened on brake-releasing movement of the brake-applying means while the brakes are retained in applied position.

11. In a fluid pressure operated braking system for an automotive vehicle having a propelling engine and its engine manifold, said system comprising a master cylinder for applying the brakes and brake cylinders adapted to receive pressure from the master cylinder to apply the brakes, a line connecting said cylinders and a normally open valve in the line between the master and brake cylinders, a pressure sensitive servo-motor adapted to close the valve to maintain the brakes applied, a hydraulic-operated electric stop-light switch adapted to receive fluid pressure as the brakes are applied, and means for relieving fluid pressure on the switch to automatically open the switch as the brake-applying means are released, while simultaneously through the medium of the valve and servo-motor maintaining fluid pressure within the brake cylinders to maintain the brakes applied.

DOUGLAS COLLINS.